United States Patent

Haidari et al.

[11] Patent Number: 5,357,386
[45] Date of Patent: Oct. 18, 1994

[54] DISC DRIVE WITH HEAD/DISC ASSEMBLY HAVING SEALED CONNECTORS

[75] Inventors: Mehdi S. Haidari, Eden Prairie; William J. Kostecka, Jordan, both of Minn.

[73] Assignee: Seagate Technology, Inc., Scotts Valley, Calif.

[21] Appl. No.: 976,214

[22] Filed: Nov. 13, 1992

[51] Int. Cl.$^5$ .................. G11B 33/14; H01R 9/09
[52] U.S. Cl. ............................ 360/97.02; 439/77
[58] Field of Search ................. 360/97.01–97.04, 360/99.04, 99.08, 98.01, 98.07, 98.08; 439/67, 77, 79, 271, 277, 556, 559, 620; 361/398

[56] References Cited

U.S. PATENT DOCUMENTS

| | | | |
|---|---|---|---|
| 4,385,333 | 5/1983 | Hasler | 360/97 |
| 4,626,055 | 12/1986 | Baker et al. | 339/60 M |
| 4,756,940 | 7/1988 | Payne et al. | 361/398 |
| 4,845,581 | 7/1989 | Bronshvatch | 360/98.01 |
| 4,846,698 | 7/1989 | Staiger et al. | 439/55 |
| 4,896,231 | 1/1990 | Hoppe | 360/97.02 |
| 4,908,597 | 3/1990 | Sutton et al. | 338/21 |
| 4,923,406 | 5/1990 | Bucknam | 439/77 |
| 4,950,170 | 8/1990 | Miller, Jr. | 439/74 |
| 4,965,684 | 10/1990 | Stefansky | 360/97.01 |
| 5,021,905 | 6/1991 | Sleger | 360/97.02 |
| 5,025,336 | 6/1991 | Morehouse et al. | 360/104 |
| 5,029,026 | 7/1991 | Stefansky et al. | 360/97.02 |
| 5,029,027 | 7/1991 | Sleger | 360/97.04 |
| 5,034,837 | 7/1991 | Schmitz | 360/105 |
| 5,097,978 | 3/1992 | Eckerd | 220/315 |
| 5,233,491 | 8/1993 | Kadonaga et al. | 360/97.02 |
| 5,241,438 | 8/1993 | Matsushima | 360/105 |

FOREIGN PATENT DOCUMENTS 9118390  11/1991  PCT Int'l Appl. ............ 360/106

*Primary Examiner*—John H. Wolff
*Assistant Examiner*—Brian E. Miller
*Attorney, Agent, or Firm*—Kinney & Lange

[57] ABSTRACT

A disc drive includes a sealed head/disc assembly that has airtight electrical connections. The head/disc assembly has a first flexible circuit having one end that has electrical contacts which provide power to a spindle motor and another end which is terminated at a first connecter that is mounted to the base of a casing. A second flexible circuit routes electrical signals to a pivotally mounted actuator. The actuator carries read/-write transducer heads and an actuator coil. One end of the second flexible circuit is coupled to the actuator and another end of the second flexible circuit is coupled to a second connector that is mounted to the base of the casing. A circuit board is mounted exterior to and along the base of the HDA casing. The circuit board includes third and fourth connectors which couple directly to the first and second connectors, respectively, when the board is mounted to the HDA.

4 Claims, 4 Drawing Sheets

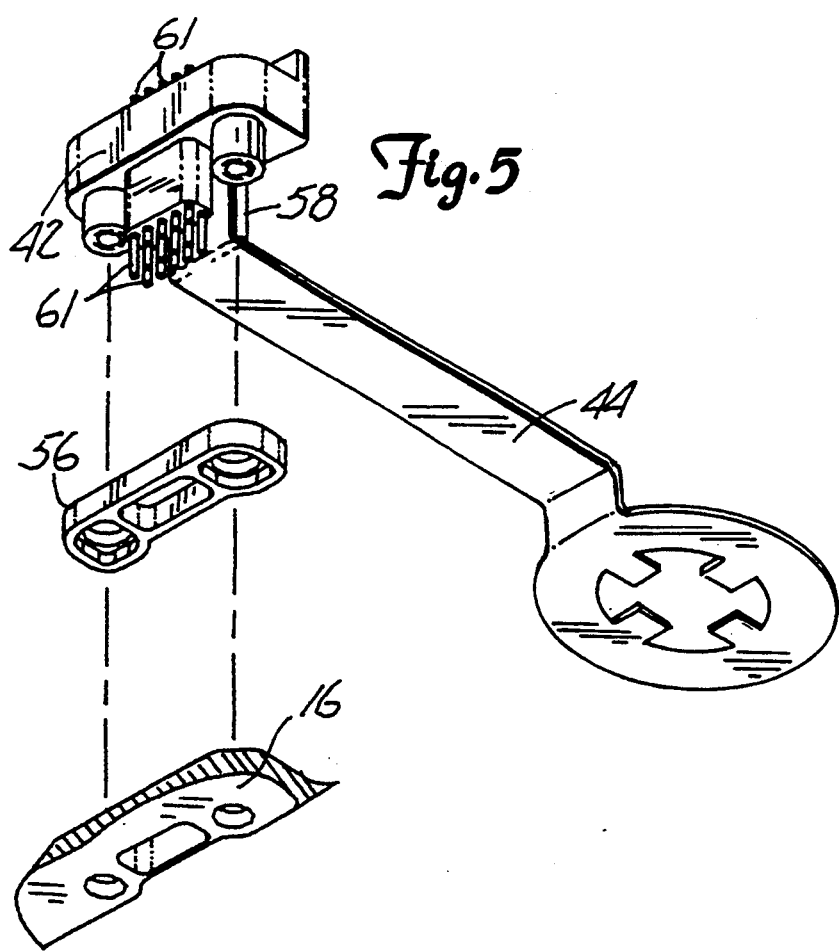

DISC DRIVE WITH HEAD/DISC ASSEMBLY HAVING SEALED CONNECTORS

BACKGROUND OF THE INVENTION

The present invention is a disc drive having a sealed head/disc assembly, wherein the head/disc assembly includes at least one connector attached to a casing of the head/disc assembly.

Disc drives are commonly used with computers to store data on concentric tracks defined in magnetic coatings formed on magnetic discs. The discs are attached to a rotating spindle which is powered by a spindle motor. Data is written to and read from selected tracks on a disc by a read/write transducer head. The transducer head is supported by a pivotally mounted actuator which moves the transducer head across the disc in response to a current applied to an actuator coil.

Typically, the spindle, spindle motor, discs, transducers, and actuator are contained in a casing, thereby forming a head/disc assembly (HDA). Electrical signals flow between the interior of the HDA and a circuit board exterior to the HDA. The circuit board in turn is connected to a disc drive interface to allow data to flow between the disc drive and an attached computer system.

As the state of disc drive technology has advanced, the storage capacity of disc drives has increased. The distance between the concentric tracks has decreased and the density of the data stored on each track has increased. To facilitate reading and writing data at higher densities, the "flying height," or distance between the read/write transducer head and the disc surface has decreased. Today's disc drives commonly have a flying height of less than ten microinches.

A typical smoke particle, or the thickness of body oil left in a finger print, are on the order of ten times this thickness, and environment dust is even larger. Accordingly, the environment inside the HDA has to be as clean as possible.

For this reason, HDAs are assembled in clean rooms, where the level of particulates and contaminants in the environment is minimized. When the HDA is assembled, it is typically sealed to prevent particulates and contaminants from entering the HDA after it leaves the clean room.

Several methods of sealing an HDA are disclosed in the prior art. For example, Eckerd, U.S. Pat. No. 5,097,978, disclosed a base member and a cover member having specified shapes. After the cover member is placed on the base member, an adhesive strip is used to seal a clearance gap between the two members. Sleger, U.S. Pat. No. 5,021,905, also disclosed a disc drive enclosure that is sealed by viscoelastic tape.

Eckerd also addressed the problem of outgassing. Outgassing occurs as a material ages, and various gases are released from the material. Outgassing is very common when using polymer based gaskets, sealers, and caulking. Accordingly, disc drive designer have had to search for sealing materials having minimal outgassing, and they have had to design casings where the physical construction of the casing provided for the released gases to vent away from the HDA.

Another problem encountered by disc drive designers was routing the electrical connections from the actuator located in the interior of the HDA to a circuit board located exterior to the HDA. Typically, a thin, flexible circuit is used to deliver signals to and remove signals from the actuator. The flexible circuit allows the actuator to move freely while maintaining the electrical connections to the actuator. In the prior art, a common method of routing signals to the exterior of the HDA was to position the flexible circuit between two pieces of the casing. After the pieces of the casing were fastened, viscoelastic adhesive tape was applied to the interface between the casing pieces, including the portion of the interface along which the flexible circuit was routed. However, routing the electrical connection by this method did not provide a tight seal, and inevitably air would leak around the flexible circuit.

SUMMARY OF THE INVENTION

The present invention is a disc drive having a sealed head/disc assembly (HDA). The HDA includes a plurality of electrical conductors which route electrical signals from components on an interior of the HDA to connector means that is mounted on a casing of the HDA. The casing forms the boundary between the interior and the exterior of the HDA.

In one embodiment, the HDA includes a first flexible circuit which routes electrical signals to a spindle motor. The first flexible circuit has one end which provides electrical contacts that supply power to the spindle motor and another end which is terminated at a first connecter that is mounted to the base of a casing.

This embodiment also has a second flexible circuit which routes electrical signals to a pivotally mounted actuator. The actuator carries read/write transducer heads and an actuator coil. One end of the second flexible circuit is coupled to the actuator and another end of the second flexible circuit is coupled to a second connector that is mounted to the base of the casing. Both connectors have gaskets between the connectors and the base of the casing to prevent air from entering or leaving the HDA at the points where the electrical signals are routed into the HDA.

This embodiment of the present invention also includes a circuit board mounted exterior to and along the base of the HDA casing. The board includes third and fourth connectors which couple directly to the first and second connectors, respectively, when the board is mounted to the HDA.

The present invention provides airtight electrical connections between the HDA interior and exterior, while minimizing the length of the electrical conductors required to make the connections and minimizing the amount of assembly required to connect the HDA to an external circuit board.

BRIEF DESCRIPTION OF THE DRAWINGS

FIG. 5 is an exploded perspective view of a connector that routes electrical signals from the exterior of the HDA to a spindle motor located in the interior of the HDA.

DETAILED DESCRIPTION OF THE PREFERRED EMBODIMENTS

Figure 1:
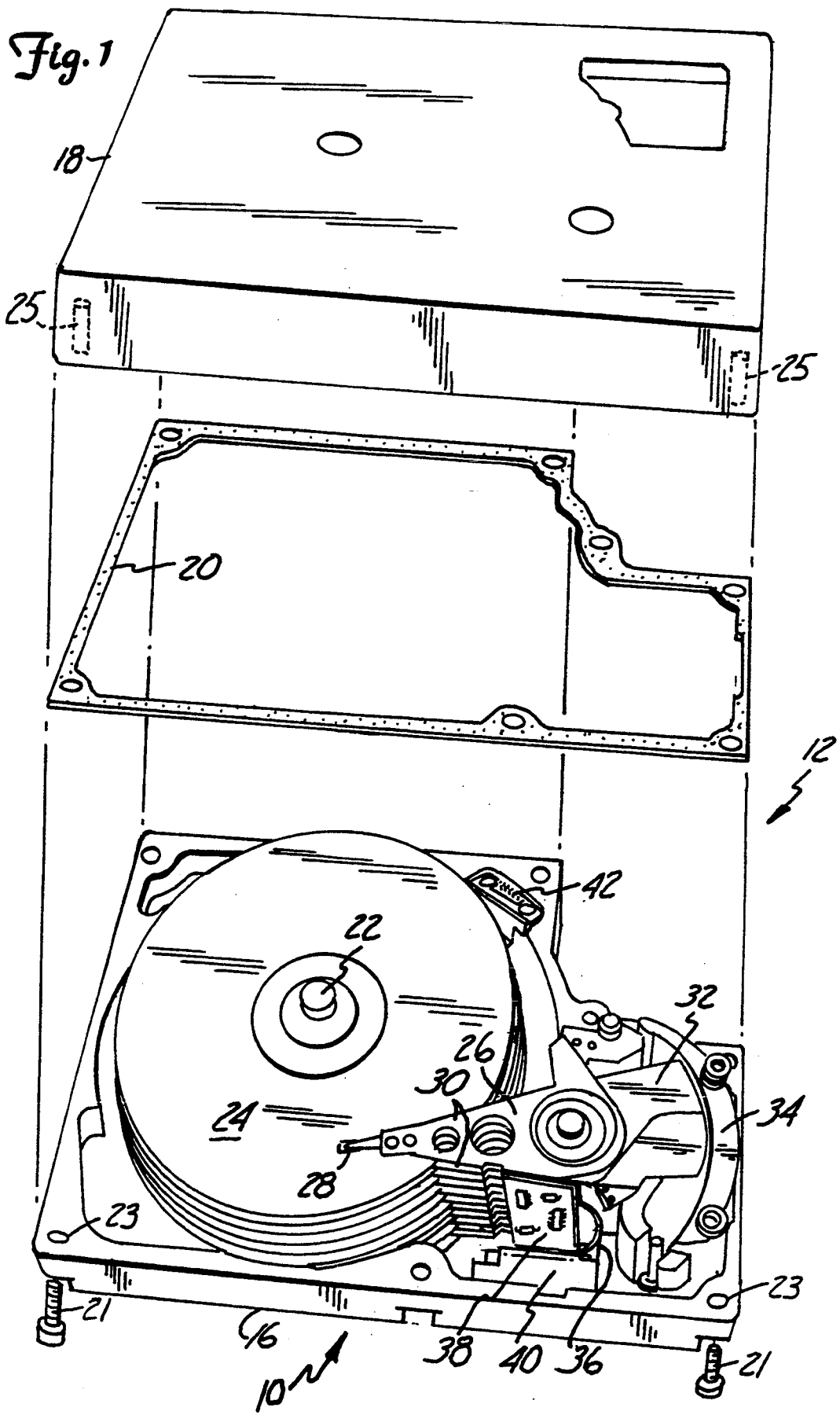
FIG. 1 is an exploded perspective view showing a top casing, a base casing, a spindle, a plurality of discs, and an actuator, which together form a head/disc assembly (HDA) that is part of a disc drive.

FIG. 1 is an exploded perspective view showing head/disc assembly (HDA) 12 of disc drive 10. HDA 12 is contained within base casing 16 and top casing 18. Base casing 16 is the casing to which most of the other components within HDA 12 are mounted. The words base and top, as used to refer to casings 16 and 18, respectively, are used herein with reference to the Figures. However, these terms in no way imply the orientation of disc drive 10 as mounted in a computer system. Additionally, the term "casing" has a meaning similar in the art to the terms "cover," "housing," "base and cover members," and "casting." Also, base casing 16, to which most of the components are mounted, is also sometimes referred to as a "deck."

Prior to the assembly of HDA 12, gasket 20 is positioned into a recess formed along the edge of top casing 18. Gasket 20 is formed from a material which exhibits no outgassing. Outgassing occurs as a material ages and produces various gases. A suitable material is available from the Minnesota Mining and Manufacturing Company under the tradename Flourel.

When HDA 12 is assembled, base casing 16 is fastened to top casing 18 by bolts 21, which are inserted through holes 23 to threaded holes 25.

Within HDA 12 are spindle 22, magnetic discs 24, and actuator assembly 26. Coupled to spindle 22 is a spindle motor which is not shown in this Figure. The spindle motor rotates spindle 22 and magnetic discs 24 at a high rate of rotation.

Data is written to and retrieved from discs 24 by transducers 28 (one of which is shown in FIG. 1). Transducers 28 are mounted on arms 30, which are part of actuator assembly 26. Actuator assembly 26 includes a actuator coil 32 which is positioned partially in magnet block assembly 34. The signals required to move actuator assembly 26, along with signals running to and from transducers 28, are provided to the actuator assembly via flexible circuit 36. One end of flexible circuit 36 is attached to circuit board 38, which is mounted on actuator assembly 26. The other end of flexible circuit 36 is attached to connector 40 (part of which is shown in FIG. 1). Connector 40 is mounted in a hole in the bottom of base casing 16.

In addition to connector 40, connector 42 is also mounted in a hole in the bottom of base casing 16. Connector 42 provides electrical signals that power the spindle motor.

Figure 2:
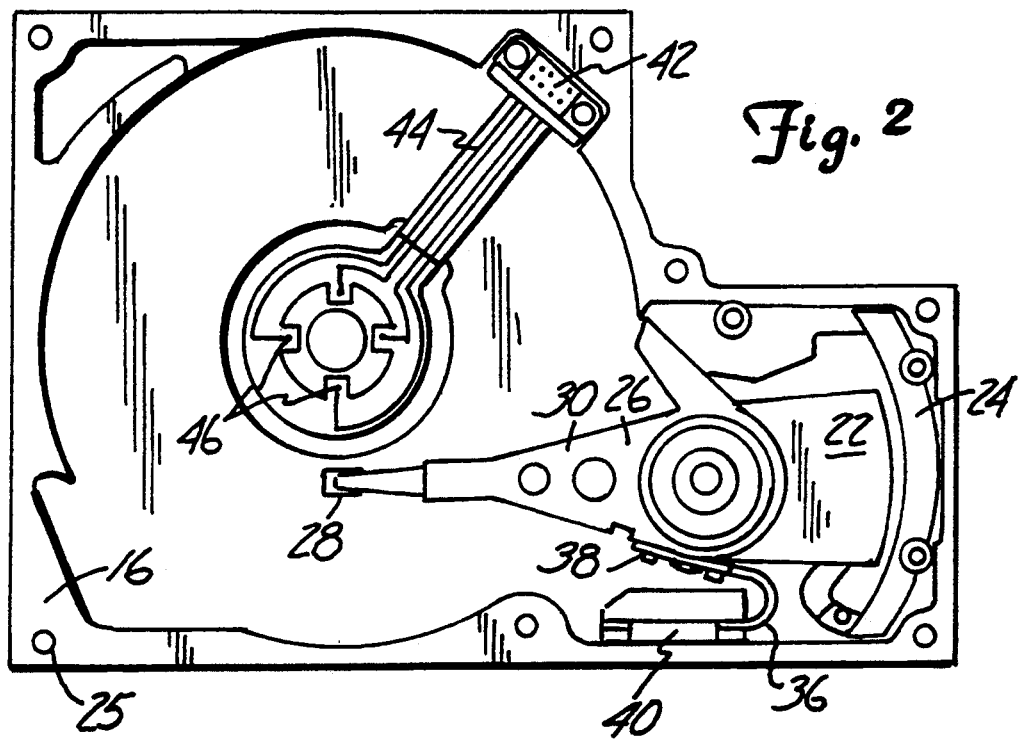
FIG. 2 is a plan view of the base casing shown in FIG. 1, with the spindle and the discs removed.

FIG. 2 is a plan view of base casing 16 with spindle 22, the spindle motor, and magnetic discs 24 removed. In this Figure, connector 42 is attached to the base of base casing 16 and is electrically coupled to flexible circuit 44. Before assembly, one side of flexible circuit 44 has an adhesive layer covered by a piece of peel-off protective paper. The protective paper is removed immediately before assembly. Once removed, flexible circuit 44 is applied to the base of base casing 16. Flexible circuit 44 includes contact points 46 which provide power to the spindle motor.

Figure 3:
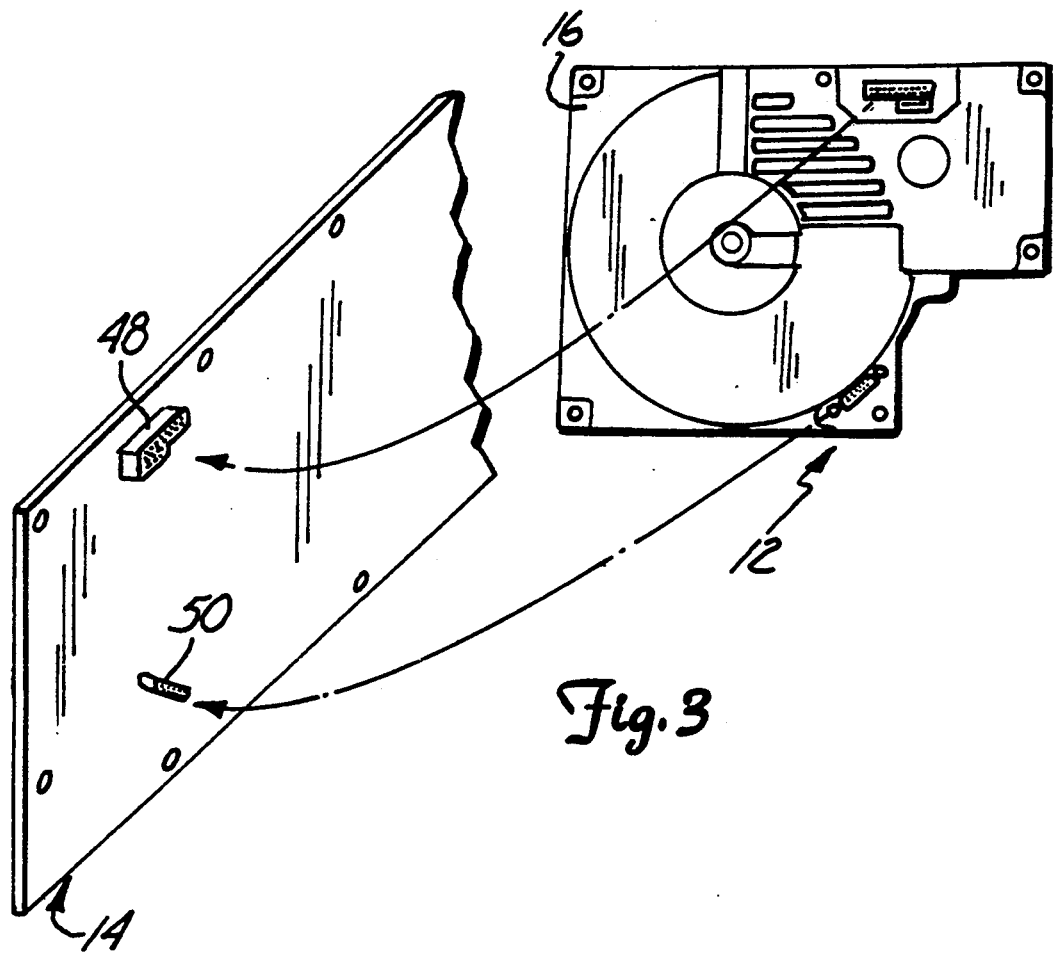
FIG. 3 is an exploded view showing an exterior of the base casing shown in FIG. 1, along with a circuit board.

FIG. 3 is an exploded view showing the exterior of base casing 16 and circuit board 14. Circuit board 14 includes connectors 48 and 50. The circuitry on board 14 is not shown in FIG. 3. When circuit board 14 is attached to the exterior of base casing 16, connector 40 of base casing 16 mates with connector 48 of circuit board 14. Likewise, connector 42 of base casing 16 mounts with connector 50 of circuit board 14.

Figure 4:
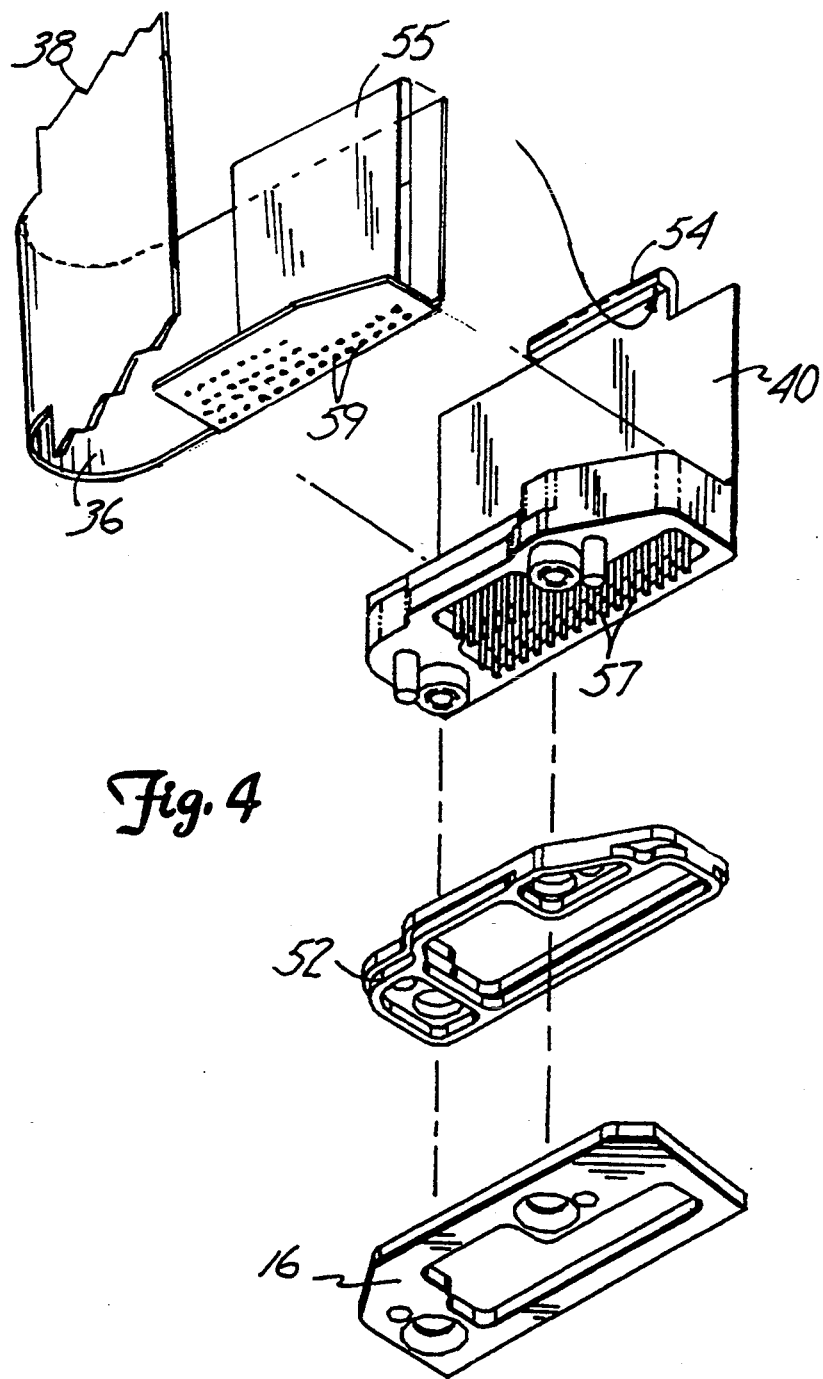
FIG. 4 is an exploded perspective view of a connector that routes electrical signals from an exterior of the HDA to the actuator located in the interior of the HDA.

FIG. 4 is an exploded perspective view of connector 40 mounted in a hole in base casing 16. Also shown in FIG. 4 is gasket 52. Like gasket 20 of FIG. 1, gasket 52 is made of a material that exhibits minimal outgassing. A suitable material is available from the Minnesota Mining and Manufacturing Company under the tradename Flourel.

FIG. 4 also shows lip 54 on connector 40. Lip 54 retains flexible circuit 36 by applying pressure to stiffener 55, which is bonded to flexible circuit 36. When flexible circuit 36 is attached to connector 40, pins 57 are inserted through and soldered to holes 59. The actual portions of pins 57 which are inserted through holes 59 are not shown in FIG. 4.

FIG. 5 is an exploded perspective view of connector 42, which is mounted in a hole of base casing 16. Also shown in FIG. 5 is gasket 56. Gasket 56, like gaskets 52 and 20, is made of a material that exhibits minimal outgassing. A suitable material is available from the Minnesota Mining and Manufacturing Company under the tradename Flourel. Connector 42 also includes retaining tab 58 which retains flexible circuit 44 against the bottom of base casing 16 when HDA 12 is assembled.

When flexible circuit 44 is to be attached to connector 44, the end of circuit 44 is routed through connector 42, between retaining tab 58 and pins 61. Flexible circuit 44 also has holes through which pins 61 are inserted and soldered.

The present invention provides an improved method of routing electrical signals into an HDA environment. In the prior art, a flexible circuit was typically routed between the upper and lower casings of the HDA. After the two casings were joined, adhesive tape was typically applied around the perimeter of the interface between the two casings to seal the HDA.

This prior art method of routing electrical connections from the interior to the exterior of an HDA did not provide an airtight seal. In addition, the portion of the flex circuit external to the HDA still had to be terminated on a board, requiring another assembly step.

In the present invention, the flexible circuits are terminated in the interior of the HDA at connectors which are attached to the base of the base casing. Compared to the prior art, the amount of flexible circuit required to route electrical signals to the exterior of the HDA is minimized. All of the flexible circuit is contained within the sealed HDA.

A circuit board having mating connectors is attached underneath the base casing of the HDA and electrically connects the circuit board to the interior components in the HDA. This produces a much more reliable connection, and it is much easier to assemble the components.

Although the preferred embodiment of the present invention utilizes a breather filter, it is contemplated that the present invention will be utilized in embodiments where the interior environment of the HDA will be completely sealed. In addition, in other embodiments it may be desirable to maintain the interior environment of the HDA at a different pressure than the exterior environment. It may also be desirable to have a different gas contained within the HDA, as opposed to the normal gases found in the atmosphere. It is contemplated that the present invention can be used in these environments.

Although the present invention has been described with reference to preferred embodiments, workers skilled in the art will recognize that changes may be made in form and detail without departing from the spirit and scope of the invention.

What is claimed is:

1. A disc drive system having a head/drive assembly and a circuit board external to the head/drive assembly, the disc drive system comprising:
    a base casing having a bottom side, side edges, a first connector hole extending through the bottom side, and a second connector hole extending through the bottom side;
    a top casing coupled to the base casing to form an enclosure enclosing the head/drive assembly;
    a spindle motor coupled to the base casing;
    a magnetic media disc in the enclosure coupled to the spindle motor;
    a transducer for recording data to and retrieving data from the magnetic media disc;
    an actuator coupled to the base casing;
    a track accessing arm having a first end coupled to the transducer and a second end coupled to the actuator;
    a first connector member mounted in the first connector hole, the connector member connecting electrical signals from an interior of the enclosure to an exterior of the enclosure and having a retaining lip with a protruding portion;
    a first flexible electrical conductor having a first end electrically coupled to the actuator and a second end electrically coupled to the first connector member;
    a stiffener bonded to the second end of the first flexible electrical conductor, with the protruding portion of the retaining lip overlying and engaging the stiffener to hold the stiffener in place;
    a second connector member mounted in the second connector hole, the second connector member connecting electrical signals from an interior of the enclosure to an exterior of the enclosure;
    a second flexible electrical conductor electrically coupled between the spindle motor and the second connector member;
    a first gasket between the first connector member and first connector hole, the first gasket having an aperture through which the first connector member extends through so that electrical signals can be transferred from an interior of the enclosure to an exterior of the enclosure while sealing between the base casing and the first connector hole, wherein the first gasket is formed from a material which minimizes outgassing; and
    a second gasket between the second connector member and the base casing, the second gasket having an aperture through which the second connector member extends so that electrical signals can be transferred from an interior of the enclosure to an exterior of the enclosure while sealing between the base casing and the second connector hole, wherein the second gasket is formed from a material which minimizes outgassing.

2. A disc drive system having a head/drive assembly, media disc, and a circuit board external to the head/drive assembly, the disc drive system comprising:
    a base casing having a bottom side and side edges;
    a top casing coupled to the base casing to form an enclosure enclosing the head/drive assembly and media disc;
    a spindle motor mounted to the base casing and coupled to the media disc;
    an actuator mounted to the base casing;
    a first connector member mounted to the bottom side for connecting electrical signals from an interior of the enclosure to an exterior of the enclosure, the first connector having a retaining lip with a protruding portion;
    a first flexible electrical conductor having a first end electrically coupled to the actuator and a second end electrically coupled to a connector portion of the first connector member; and
    a stiffener bonded to the second end of the first flexible electrical conductor, with the protruding portion of the retaining lip overlying and engaging the stiffener to retain the first flexible electrical conductor in mechanical contact with the connector portion.

3. The system as in claim 2 including a second connector member mounted to the bottom side for connecting electrical signals from the interior of the enclosure to the exterior of the enclosure, and a second flexible electrical conductor electrically coupled between the spindle motor and the second connector member.

4. The system as in claim 3 including first and second connector holes in the bottom side receiving the respective first and second connector members, a first gasket between the first connector member and first connector hole, the first gasket having an aperture through which the first connector member extends through so that electrical signals can be transferred from an interior of the enclosure to an exterior of the enclosure while sealing between the base casing and the first connector hole, a second gasket between the second connector member and the base casing, the second gasket having an aperture through which the second connector member extends so that electrical signals can be transferred from an interior of the enclosure to an exterior of the enclosure while sealing between the base casing and the second connector hole, the first and second gaskets being formed of a material which minimizes outgassing.

* * * * *